United States Patent Office 3,214,219
Patented Oct. 26, 1965

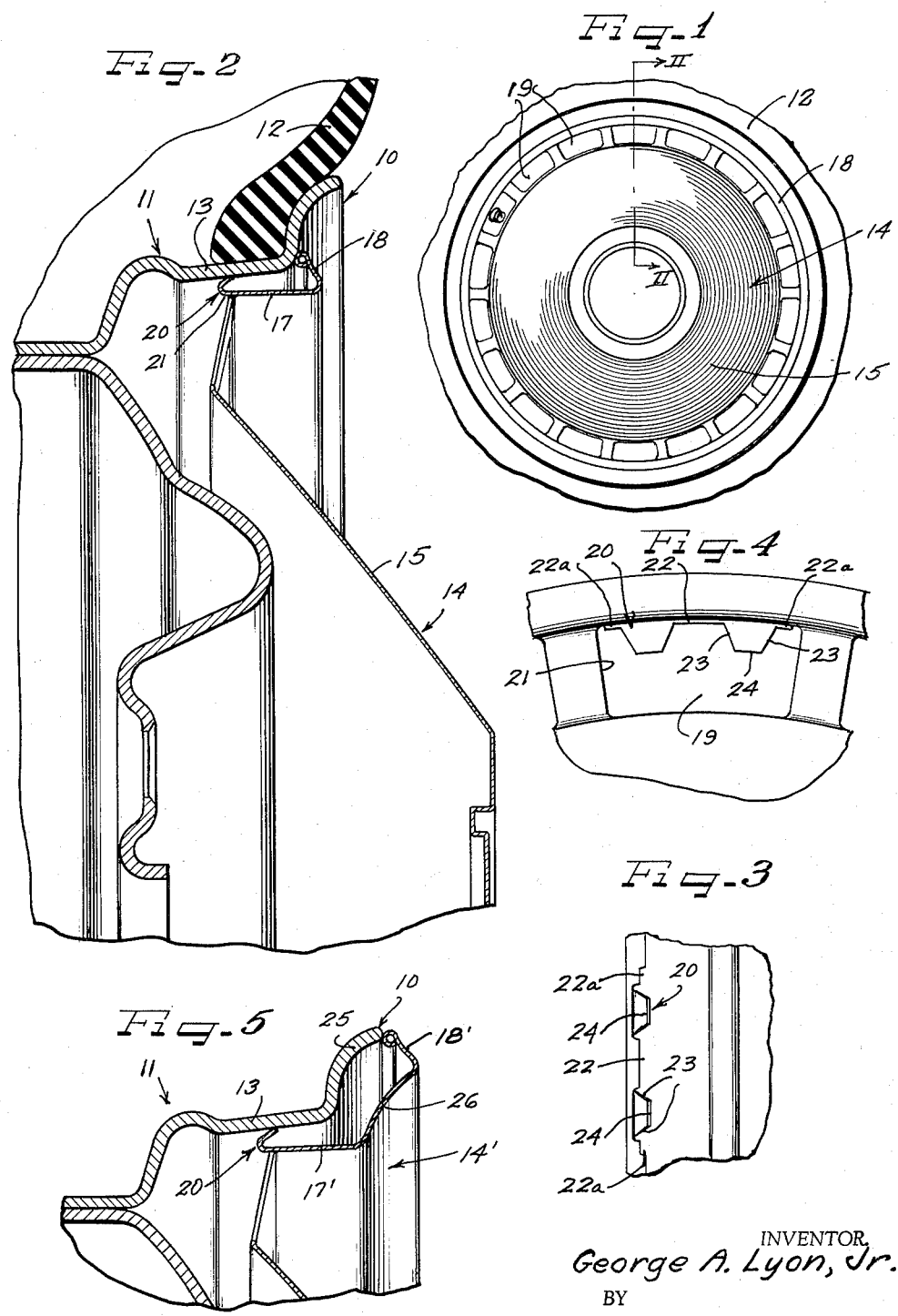

3,214,219
WHEEL COVER
George Albert Lyon, Jr., Birmingham, Mich., assignor to Lyon Incorporated, Detroit, Mich., a corporation of Delaware
Filed Nov. 8, 1963, Ser. No. 322,444
5 Claims. (Cl. 301—37)

This invention relates to wheel covers and more particularly to circular dished ornamental wheel covers for automobile wheels.

An object of this invention is to provide an improved automobile wheel cover which lends itself to economical manufacture on a large production basis.

Another object of this invention is to provide an ornamental wheel cover wherein portions or tabs punched out of the body of the cover to ornament the cover with an annular series of spaced holes, are utilized for the formation of novelty constructed and reinforced fingers for yieldable and detachable retaining cooperation with a flange of an automobile wheel rim.

In accordance with the general features of the invention, there is provided a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes formed, at least in part, by axially rearwardly punched tabs, each of said tabs being joined to the cover at a radially outer edge of the corresponding hole opposite the rim outer flange and having at least a portion thereof formed into a plurality of fingers joined together by a connecting skirt for causing the fingers to move in unison, the fingers each being curled axially rearwardly into a bulge and then radially and axially outwardly and terminating in a circumferentially extending terminal biting edge for slidingly gripping the rim flange in the yieldable and detachable retention of the cover on the wheel.

Other objects and features of this invention will more fully appear from the following detailed description taken in connection with the accompanying drawings which illustrate several embodiments of the invention and in which:

FIGURE 1 is a side elevation or front view of a wheel cover of my invention applied to a wheel;

FIGURE 2 is an enlarged fragmentary cross-sectional view taken substantially on the line II—II of FIGURE 1, looking in the direction indicated by the arrows and showing the contour of the retaining fingers formed from punched out tabs;

FIGURE 3 is a fragmentary detail view, looking at a portion of the circumferential edge of the cover and showing a set of fingers projecting therefrom;

FIGURE 4 is a fragmentary detail view looking at the cover from the outer side, showing one of the holes therein and illustrating how a set of fingers are cut from the tab punched from the hole prior to the curling of the fingers into the shape shown in FIGURE 2; and FIGURE 5 is a fragmentary cross-sectional view similar to FIGURE 2 illustrating a modification of the invention wherein the wheel cover extends clear to the outer edge of the wheel rim.

As shown on the drawings:

Reference character 10 designates generally an automobile wheel having a conventional multi-flanged tire rim 11 which carries a tire 12. The rim 11 includes a generally axially extending inclined flange 13 with which my novel wheel cover 14 retainingly and detachably cooperates.

The wheel cover 14 comprises a dished stamping made from any suitable sheet material such, for example, as stainless steel. This cover includes a central crown portion 15, a depressed or dished intermediate annular portion 16 and an axially outwardly extending annular portion 17 opposite rim flange 13, and a turned outer edge 18 adapted to bottom on the rim 11.

My present invention concerns itself with the provision of the cover 14 with integral retaining fingers 20 formed from punched out tabs 19 (FIGURE 4). I propose to ornament the cover by providing an annular series of spaced openings 21 which are made by punching out the tabs 19. At least a portion of each tab is formed into one or more of the curled or bulged fingers 20. In FIGURE 4, it is shown how the fingers are formed from the tabs while in a flat form and prior to the curling of them into ultimate form shown in FIGURE 2.

In the illustrated embodiment, a pair of fingers 20 is formed from each tab 19 and has integral lateral angled extensions 22 and 22a—22a. In other words, the fingers are connected, by what might be termed a skirt, to the inner portion of axially extending cover part 17. When curled, not only is the finger 20 proper bulged and turned, as shown in FIGURE 2, but the extensions or skirt portions 22 and 22a—22a are likewise turned with the finger, leaving the opening 21. Each finger has tapered sides 23—23 as well as a circumferentially extending biting edge 24 between the tapered or inclined finger sides 23.

It has been found that the short angled extensions 22 and 22a—22a tend to rigidify the fingers and to back them up when the gripping edge 24 of the finger slidably and detachably engages the surface of rim flange 13.

In applying the cover to the wheel, it is placed over the center of the wheel and then pressed axially inwardly, causing its fingers 20 to yieldably and resiliently engage the slightly inclined surface of the rim flange 13, thereby camming the fingers into tight cover retaining cooperation with the wheel rim.

The construction and the angle of the fingers, however, is such that when a pry-off force, such as the edge of a screwdriver, is applied to the curled cover edge 18, the cover can be pried free of the wheel without permanently distorting the retaining fingers.

In this application and removal of the wheel cover with respect to the wheel, the relatively narrow stiff angled lateral finger extensions 22 and 22a—22a not only reinforce the fingers, but back-up the fingers in their yieldable cooperation with the wheel rim flange 13.

In FIGURE 5, I have illustrated a modification of the invention wherein wheel rim 10 includes a flange 11 as in FIGURE 2. Cooperating with this rim 10 is a wheel cover 14' which is retained in the same manner as the cover 14, but is enlarged to cover the terminal flange 25 of the wheel rim.

This enlargement of the cover 14' is effected by providing an intermediate ring-like cover portion 26 between the axial portion 17' and the curled outer portion 18' of the cover. Otherwise, this form of the invention operates and functions in the same manner as the first described form.

I claim as my invention:

1. In a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes formed, at least in part, by axially rearwardly punched tabs, each of said tabs being joined to the cover at a radially outer edge of the corresponding hole opposite said rim outer flange and having at least a portion thereof formed into a plurality of fingers joined together by a connecting skirt disposed alongside of each hole for causing said fingers to move in unison, said fingers each being curled axially rearwardly into a bulge and then radially and axially outwardly and terminating in a circumferentially extending terminal biting edge for slidingly gripping said rim flange in the yieldable and detachable retention of the cover on the wheel, the skirts being circumferentially spaced with respect to one another and being resiliently flexible independently of one another, each of said holes being defined by side edges and with opposite ends of the skirt associated with each hole being spaced circumferentially of the associated side edges of the hole whereby the circumferential length of the skirt is less than a circumferential width of the associated hole to permit the skirt to flex independently and free of the side edges of the hole.

2. In a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes formed, at least in part, by axially rearwardly punched tabs, each of said tabs being joined to the cover at a radially outer edge of the corresponding hole opposite said rim outer flange and having at least a portion thereof formed into a plurality of fingers joined together by a connecting skirt for causing said fingers to move in unison, said fingers each being curled axially rearwardly into a bulge and then radially and axially outwardly and terminating in a circumferentially extending terminal biting edge for slidingly gripping said rim flange in the yieldable and detachable retention of the cover on the wheel, each set of said fingers, formed from a tab, having said skirt between them and also having short circumferential extensions, at the outer radial sides of the set of fingers, connecting the fingers to the cover proper for augmenting back-up of the fingers by the cover, said holes each being defined by side edges and with said circumferential extensions being spaced from said side edges of the hole to permit relative movement to occur therebetween.

3. In a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes formed, at least in part, by axially rearwardly punched tabs, each of said tabs being joined to the cover at a radially outer edge of the corresponding hole opposite said rim outer flange and having at least a portion thereof formed into at least one finger with elongated narrow angled skirt portions at the side extremities of the finger where the tab is joined to the cover, said skirt portions associated with each hole having a circumferential width less than a circumferential width of the hole to permit the skirt portions to move freely of side edges of the associated hole.

4. In a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes formed, at least in part, by axially rearwardly punched tabs, each of said tabs being joined to the cover at a radially outer edge of the corresponding hole opposite said rim outer flange and having at least a portion thereof formed into at least one finger with elongated narrow angled skirt portions at the side extremities of the finger where the tab is joined to the cover, said finger being curled axially rearwardly into a bulge and then radially and axially outwardly and terminating in a circumferentially extending terminal biting edge for slidingly gripping said rim flange in the yieldable and detachable retention of the cover on the wheel, said skirt portions associated with each hole having a circumferential width less than a circumferential width of the hole to permit the skirt portions to move freely of side edges of the associated hole.

5. In a cover structure for a wheel having a multi-flanged tire rim including a generally axial outer annular flange, a circular wheel cover extending at least over said rim outer flange and having radially inwardly of said flange an axially inwardly dished portion provided with an annular series of spaced holes, at least a set of axially rearwardly extending fingers being joined to the cover at a radially outer edge of the associated hole opposite said rim outer flange, the fingers in each set being joined at axially outer ends by a connecting skirt for causing said fingers in the set of fingers joined with the associated skirt to move in unison, the skirts being circumferentially spaced with respect to one another and being resiliently flexible independently of one another, said fingers terminating in a circumferentially extending terminal biting edge for slidingly gripping said rim flange in the yieldable and detachable retention of the cover on the wheel, each of said holes being defined by side edges and with opposite ends of the skirt associated with each hole being spaced circumferentially of the associated side edges of the hole whereby the circumferential length of the skirt is less than a circumferential width of the associated hole to permit the skirt to flex independently and free of the side edges of the hole.

References Cited by the Examiner

UNITED STATES PATENTS

| 2,686,082 | 8/54 | Lyon | 301—37 |
| 2,757,972 | 8/56 | Lyon | 301—37 |
| 2,761,739 | 9/56 | Lyon | 301—37 |
| 3,053,576 | 9/62 | Lyon | 301—37 |

FOREIGN PATENTS 515,630  8/55  Canada.

ARTHUR L. LA POINT, *Primary Examiner.*